United States Patent [19]

Nakaya et al.

[11] 4,315,557
[45] Feb. 16, 1982

[54] DIAPHRAGM FOR ELECTRO-ACOUSTIC TRANSDUCER

[75] Inventors: Takao Nakaya, Hamamatsu; Akira Nakamura, Shizuoka, both of Japan

[73] Assignee: Nippon Gakki Seizo Kabushiki Kaisha, Hamamatsu, Japan

[21] Appl. No.: 154,459

[22] Filed: May 29, 1980

[30] Foreign Application Priority Data

May 31, 1979 [JP] Japan .............. 54-73389[U]

[51] Int. Cl.$^3$ .............. G10K 13/00; B32B 3/12; H04R 7/10
[52] U.S. Cl. .............. 181/168; 181/169; 428/118
[58] Field of Search .............. 181/167–170; 179/115.5 R, 181 R; 428/116, 118

[56] References Cited

U.S. PATENT DOCUMENTS

| | | | |
|---|---|---|---|
| 3,003,191 | 10/1961 | Luth | 181/169 X |
| 4,076,098 | 2/1978 | Ward | 181/169 X |
| 4,190,746 | 2/1980 | Hardwood et al. | 181/170 X |
| 4,198,550 | 4/1980 | Matsuda | 181/167 X |

FOREIGN PATENT DOCUMENTS 52-65421  5/1977  Japan .............. 181/169

Primary Examiner—L. T. Hix
Assistant Examiner—T. H. Tarcza
Attorney, Agent, or Firm—Cushman, Darby & Cushman

[57] ABSTRACT

A diaphragm for electro-acoustic transducer comprising a core member of honeycomb structure made of either a thin film of a metal or a high molecular material, and a skin member bonded to at least one side of this honeycomb core structure and being prepared by the use of aromatic polyamide fibers having a high tensile strength, a high Young's modulus and a high Young's modulus-to-weight ratio and reinforced by a thermosetting resin. Such diaphragm has a high Young's modulus, an improved mechanical strength and a wide frequency range of piston motion, and presents reduced distortion throughout a wide frequency range, and has a superior transition characteristic, whereby a good sound reproduction characteristic is obtained.

11 Claims, 5 Drawing Figures

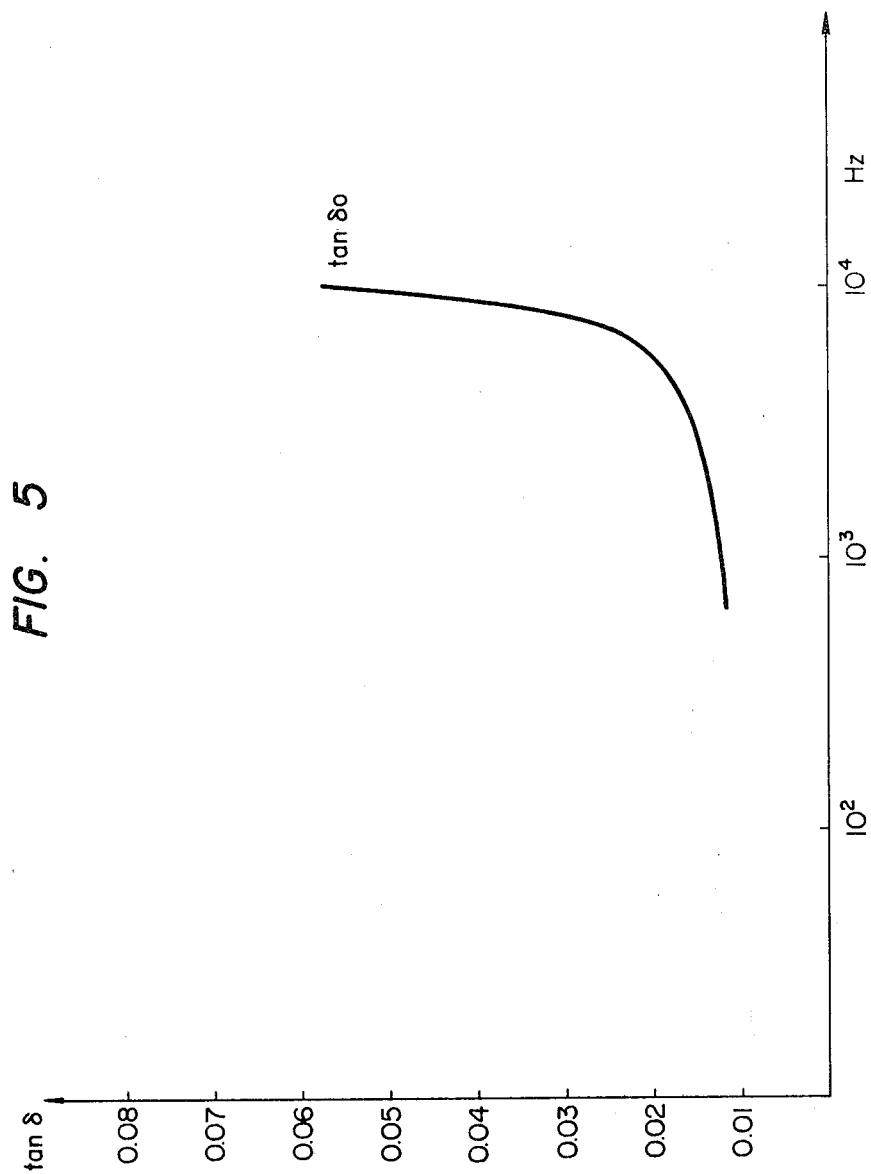

DIAPHRAGM FOR ELECTRO-ACOUSTIC TRANSDUCER

BACKGROUND OF THE INVENTION (a) Field of the Invention

The present invention relates to a diaphragm for use in electro-acoustic transducers such as loudspeakers, headphones, microphones and the like, and more particularly it pertains to a diaphragm having a honeycomb structure as its core member.

(b) Description of the Prior Art

As well known to those skilled in the art of audio devices, diaphragms for use in such electro-acoustic transducers as a loudspeaker are required to make a piston motion through a wide frequency range, as well as to have an internal loss of an appropriate magnitude. The piston motion of a diaphragm is impaired by the development of partial vibrations in the diaphragm itself. These partial vibrations are roughly classified into the following two types, one of which is axisymmetric partial vibration which constitutes a factor of determining the applicable frequency range of a diaphragm in its designing, and the other is non-axisymmetric partial vibration which serves as a factor to increase the distortion. The axisymmetric partial vibration may be suppressed by, for example, increasing the thickness of the diaphragm and increasing the ratio of Young's modulus E to density $\rho$, i.e. Young's modulus-to-weight ratio $E/\rho$. Also, the non-axisymmetric vibration may be suppressed by, for example, arranging the diaphragm so as to be uniform in both structure and material with which it is made, and to have a substantial thickness, and also to have a substantially large Young's modulus-to-weight ratio $E/\rho$. On the other hand, the internal loss dominates the magnitude of the peak level of the high frequency range resonance curve in SPL (sound pressure level)/frequency response. In case the difference between the peak and the bottom of the high frequency range resonance curve is great, the sound produced will be perceived as unpleasant in its quality to listeners. It is known to be possible to avoid the offensiveness, to the ears, of a sound reproduced, by setting the internal loss $\eta$ (dissipation factor tan $\delta$) at an appropriately large value, thereby reducing the peak level of the high frequency range resonance curve to a low level.

Accordingly, a diaphragm is required to have a substantially large thickness and a large Young's modulus-to-weight ratio $E/\rho$ to provide both light-weight and increased rigidity features, as well as required to have a piston motion through a wide range of frequency, and further to have an appropriately large internal loss.

Recently, there have been put to use acoustic diaphragms for use in such audio devices as loudspeakers, which employ a honeycomb core member made with a metal sheet or a high molucular sheet material and provided with a skin member adhering to a surface of this core member. Since the diaphragm of this type has a honeycomb core structure, the diaphragm can be manufactured to be light in weight and high in rigidity. Also, the apparent density $\rho$ of the diaphragm as a whole is low, so that the Young's modulus-to-weight ratio, i.e. the ratio $E/\rho$ between Young's modulus E and density $\rho$, is large, whereby it is possible to obtain a good sound reproduction characteristic as represented by piston motion through a wide range of frequency and by a reduced distortion for a wide range of frequency. Besides, such honeycomb core type diaphragm laminated with the skin is known to have an advantageous structure which allows to set its internal loss at an appropriately large value due to attenuation of vibration attributable to the laminated structure, thereby substantially suppressing the development of resonance in the high frequency range all allowing a flat frequency characteristic to be obtained.

In spite of such superior structure of the known diaphragm of this type as stated above, it is the actual state of such diaphragm that no sufficiently satisfactory diaphragm structure has been provided. More particularly, in the known diaphragms of this type, the properties of the skin member per se for use in the laminated structure give a great influence on the general characteristics of the diaphragm as a whole. Those skin members which have been employed in known diaphragms invariably have strong points and weak points, and thus they are still far from satisfying all of the requirements expected of a diaphragm. For example, there are skin members which have been used widely for diaphragms of this laminated structure type and are made with a paper sheet formed with fibers of wood pulp or with a metal foil such as aluminum foil. However, while a paper skin member made of wood fibers has a large internal loss $\eta$ (dissipation factor tan $\delta$), thus making difficult the tendency to develop resonance in the high frequency range and also providing a flat frequency characteristic, the paper skin member has a low Young's modulus E, resulting in a low efficiency in the reproduction of sound, and has a low Young's modulus-to-weight ratio $E/\rho$ in the completed diaphragm, causing a narrow range of piston motion, and thus there cannot be obtained such a good sound reproduction characteristic as represented by reduced distortion in the high frequency range and by a superior transition characteristic. On the other hand, skin members using a metal foil have the advantages that they have a relatively high Young's modulus E, allowing the Young's modulus-to-weight ratio $E/\rho$ to be made large and thus providing a sound reproduction characteristic as represented by reduced distortion through a wide frequency range and superior in transition characteristic. However, the metal foil skin member, while its having a honeycomb core member which should allow the internal loss to be made large, has the property that its internal loss is markedly small, and thus there is the actual problem that a sharp resonance develops in the high frequency range so that the reproduced tone in the high frequency range tends to become irritating to the ears of listeners.

Hereunder is shown in Table 1 the result of comparison between skin members made with metal foil and skin members made with paper.

TABLE 1

| Material of skin member | Young's modulus(E) ($10^6$N/m$^2$) | Density($\rho$) ($10^3$kg/m$^3$) | Young's modulus-to-weight ratio (E/$\rho$) ($10^6$m$^2$/sec$^2$) | Internal loss (tan $\delta$) |
|---|---|---|---|---|
| Titanium | 110,000 | 4.5 | 24.01 | 0.002 |
| Aluminum | 70,000 | 2.7 | 26.01 | 0.002 |
| Paper | 2,000 | 0.5 | 4.00 | 0.05 |

Furthermore, there have been proposed skin members formed with a carbon fiber-reinforced plastic material. While a carbon fiber-reinforced plastic material has a large Young's modulus-to-weight ratio $E/\rho$, its strength-to-weight ratio cannot be necessarily termed as being sufficient, and in addition there is the disadvantage that its manufacturing cost is high.

SUMMARY OF THE INVENTION

It is, therefore, an object of the present invention to provide an diaphragm for an electro-acoustic transducer which is acoustically and mechanically superior and low in manufacturing cost and which has a laminated structure having a core member provided with a skin member made of an aromatic polyamide material having a high Young's modulus-to-weight ratio and high strength-to-weight ratio and having an appropriately large internal loss.

Another object of the present invention is to provide a diaphragm for an electro-acoustic transducer which has a laminated structure having a core member formed of cellular material, for example honeycomb structure, and provided with a skin member.

Further object of the present invention is to provide a diaphragm for an electro-acoustic transducer which has a laminated structure having a core member provided with a skin member made of aromatic polyamide fibers.

Still further object of the present invention is to provide a diaphragm for an electro-acoustic transducer which has a laminated structure having a core member provided with a skin member of a composite material made of a woven fabric of aromatic polyamide fibers having been reinforced by a thermo-setting resin.

Other objects of this invention will become apparent from the following description given with reference to the accompanying drawings.

BRIEF DESCRIPTION OF THE DRAWINGS

FIG. 5 is a graph showing the frequency characteristic of dissipation factor (tan δ) of an aromatic polyamide fiber-reinforced plastic skin member.

DETAILED DESCRIPTION OF THE PREFERRED EMBODIMENT

Description will hereunder be made of an embodiment of the diaphragm according to the present invention by referring to the accompanying drawings.

Figure 1:
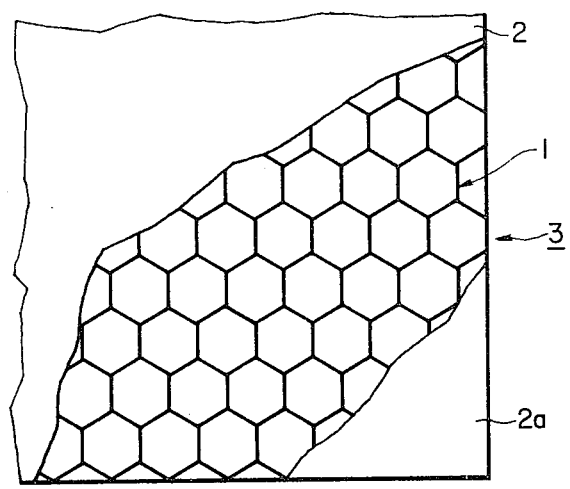
FIG. 1 is a diagrammatic plan view, partly broken away, showing a front view of an acoustic diaphragm according to an embodiment of the present invention.
Figure 2:
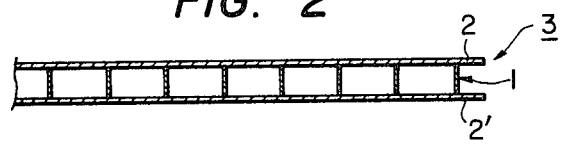
FIG. 2 is a diagrammatic vertical sectional view, partly broken away, of the diaphragm of FIG. 1.

FIGS. 1 and 2 show an embodiment of the diaphragm according to the present invention. A core 1 of the diaphragm is formed with a honeycomb structure which, in FIGS. 1 and 2, is made with either a metal member such as aluminum or an aluminum alloy, or a thin film of a high molecular material prepared by the use of polyamide fibers such as one sold by Dupont in the U.S.A. under the tradename NORMEX, by impregnating these fibers with a phenol resin and by setting it. This core is comprised of a number of continuous cells arranged in honeycomb fashion. The honeycomb cells may have any required cell size. An example of cell size in case of an aluminum honeycomb core is 6.3 mm in diameter of the inscribed circle of the cell, 25 micrometers in thickness of the aluminum walls of the cell, 5.0–10.0 mm in height, and 0.037 g/cm$^3$ in density. To both sides of the core 1 are bonded skin members 2 and 2a, respectively. Each of those skin members 2 and 2a may be applied onto each side of the core which is already applied with a bonding agent. Alternatively, a skin member impregnated with a semi-set FRP resin which is applied to each side of the core, and then they are subjected to heat-pressing. Each of these skin members 2 and 2a is made with a woven fabric of aromatic polyamide fibers such as poly-p-benzamide fibers and polyparaphenylene-terephthalamide fibers, and by impregnating this fabric with a thermo-setting resin such as an epoxy resin, unsaturated polyester resin and phenol resin, and allowing this resin to set. Thus, a diaphragm 3 is constructed. Said poly-p-benzamide fibers may be of the type sold by Dupont of the U.S.A. under the tradename KEVLAR-49. Also, said polyparaphenylene-terephthalamide fibers may be the type sold by Dupont under the tradename FIBER-B.

Figure 3:
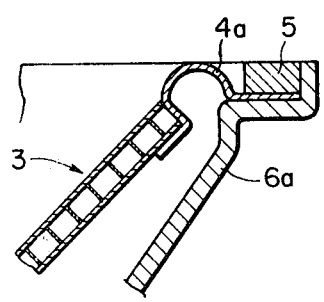
FIGS. 3 and 4 are diagrammatic vertical sectional views, partly broken away, showing examples, respectively, of the use of the diaphragm according to the present invention.

FIG. 3 shows an example of the diaphragm according to the present invention which is applied to a cone loudspeaker. In this example, the diaphragm 3 is formed to have a cone shape. The circumferential peripheral edge portion of the diaphragm 3 is bonded to an edge member 4a which is made with a material such as foamed urethane or vinyl chloride. This edge member 4a, in turn, is fixed, by an annular gasket 5 to an open end portion of a cone-shaped frame 6a.

Figure 4:
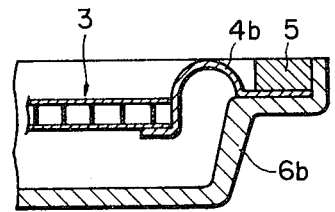

FIG. 4 shows an example of diaphragm which is applied to a planar type loudspeaker or to a headphone. In this example, the diaphragm 3 is formed in planar shape. Its circumferential peripheral portion is placed on a surface of an inner end portion of an edge member 4b, and is bonded thereat. The outer end portion of this edge member 4b is fixed, by an annular gasket 5, to an open end portion of a frame 6b.

Next, the result of comparison between the properties of aromatic polyamide fibers per se which are employed in skin members of the diaphragm according to the present invention and the properties of other fibers, i.e. in this case glass-fibers and carbon fibers, is shown in the following Table 2.

TABLE 2

| Fiber used | Tensile strength(σ) (10$^6$N/m$^2$) | Young's modulus(E) (10$^6$N/m$^2$) | Density(ρ) (10$^3$kg/m$^3$) | Strength-to-weight ratio(σ/ρ) (10$^6$ . (m/s)$^2$) | Young's modulus-to-weight ratio(E/ρ) (10$^6$ . (m/s)$^2$) |
|---|---|---|---|---|---|
| (Present invention) Aromatic polyamide fiber (KEVLAR-49) | 2,740 | 123,500 ~ 137,200 | 1.45 | 1.89 | 85.2 ~ 94.6 |
| (Controls) Glass fiber (E-glass)* | 2,400 ~ 2,740 | 72,000 | 2.54 | 0.94 ~ 1.08 | 28.3 |
| Glass fiber (S-glass)** | 3,430 ~ 4,800 | 82,300 ~ 88,200 | 2.48 | 1.38 ~ 1.94 | 33.2 ~ 35.6 |

TABLE 2-continued

| Fiber used | Tensile strength($\sigma$) ($10^6$N/m$^2$) | Young's modulus(E) ($10^6$N/m$^2$) | Density($\rho$) ($10^3$kg/m$^3$) | Strength-to-weight ratio($\sigma/\rho$) ($10^6 \cdot$ (m/s)$^2$) | Young's modulus-to-weight ratio(E/$\rho$) ($10^6 \cdot$ (m/s)$^2$) |
|---|---|---|---|---|---|
| Carbon fiber (TORAYCA T300A)*** | 2,450 | 215,600 | 1.78 | 1.38 | 121.1 |
| Carbon fiber (CARBOLON Z-2-1)**** | 2,940 | 215,600 | 1.74 | 1.69 | 123.9 |

Notes:
*indicates "electric glass".
**indicates "high-strength glass".
***indicates the tradename of product sold by Toray, Ltd.
****indicates the tradename of product sold by Japan Carbon, Ltd.

As will be clear from Table 2, the aromatic polyamide fiber of the present invention has a low density $\rho$, a high tensile strength $\sigma$ and a high Young's modulus E. Whereby, both the Young's modulus-to-weight ratio E/$\rho$ and strength-to-weight ratio $\sigma/\rho$ of this fiber are generally high, and especially its strength-to-weight ratio $\sigma/\rho$ is outstandingly superior to that of other kinds of fibers. As such, a skin member which is prepared by the use of a woven fabric of aromatic polyamide fibers and by impregnating this fabric with a thermo-setting resin, and then allowing the resulting fabric to become solidified, has a high Young's modulus-to-weight ratio E/$\rho$ and a high strength-to-weight ratio $\sigma/\rho$. Also, a skin member prepared from such a woven fabric as mentioned above can be made to have an internal loss $\eta$ (dissipation factor tan $\delta$) close to that of a paper-made skin member having a relatively large inherent internal loss, by selecting the resin per se having a large internal loss. In general, the thin film of the skin of this laminated structure has a thickness of 0.1–0.3 mm. The thickness of the skin member obtained according to the present invention is closely associated with the density thereof in designating a diaphragm. Thus, the thickness of the skin member may vary depending on the density of this member.

Description has been made with respect to an instance of the diaphragm which is constructed by the use of a honeycomb core 1 which is bonded onto both sides thereof, with skin members 2 and 2a, respectively. It should be understood, however, that a skin member 2 may be applied to only one side of the honeycomb core 1, as desired. Also, even in case skin members 2 and 2a may be of the type prepared by impregnating a woven fabric of polyamide fibers with a thermo-setting resin then solidified, and the other of the skin members may be comprised of a thin film made of some other material such as paper.

Hereunder is shown in Table 3 the result of a comparison between the skin member made from the above-mentioned resin-impregnated aromatic polyamide fibers and a skin member prepared from another kind of fibers, specifically E-glass fiber-reinforced plastic (FRP) film.

TABLE 3

| FRP skin | Tensile strength($\sigma$) ($10^6$N/m$^2$) | Young's Modulus(E) ($10^6$N/m$^2$) | Density($\rho$) ($10^3$kg/m$^3$) | Strength-to-weight ratio($\sigma/\rho$) ($10^6 \cdot$ (m/s)$^2$) | Young's modulus-to-weight ratio(E/$\rho$) ($10^6 \cdot$ (m/s)$^2$) |
|---|---|---|---|---|---|
| (present Invention) *FRP of aromatic polyamide fiber (KEVLAR-49-FRP) | 700 | 40,650 | 1.38 | 0.51 | 29.5 |
| (Control) E-glass FRP | 570 | 24,100 | 2.08 | 0.27 | 11.6 |

Notes:
*60% by volume of fiber was mingled in 100% by volume of fiber impregnated with an epoxy resin, and this percentage of resin-impregnation is desirable in general. A group of fibers arranged in parallel relative to each other are placed one upon another group of fibers in a way that the orientation of fibers in one group is substantially perpendicular to the orientation of fibers in the adjacently superposed another group. This type of fabric is called "plain weave".

The skin member made with FRP of aromatic polyamide fibers shows an internal loss (tan $\delta$) of 0.0123–0.0482.

Description has been made with respect to an embodiment wherein the skin member is made with a thin film prepared by the use of aromatic polyamide fibers impregnated with a thermo-setting resin such as an epoxy resin and set thereafter. It should be understood, however, that the skin member may be a non-woven film made with a thin film prepared by impregnating a group of randomly oriented aromatic polyamide fibers and setting the resulting fibers. Alternatively, the thin film of skin member may be prepared with a plastic film of aromatic polyamide alone.

As shown in FIG. 5, resin-impregnated aromatic polyamide fibers have a constant value of tan $\delta$ in the medium frequency range and have a higher value of tan $\delta$ in the higher frequency range.

Accordingly, the skin member obtained according to the present invention is able to suppress the development of partial vibration in an appropriate manner in the medium frequency range which includes the majority of important frequency components of a musical sound, and at the same time it sufficiently suppresses the development of unpleasant resonance in the high frequency range. Such a desirable function of this skin member is especially prominent when used in a diaphragm having an aluminum honeycomb core structure which tends to develop resonance in the high frequency range, in such way that the skin member is able to suppress the development of partial vibration in an optimum manner.

As will be clear from the foregoing descriptions, the diaphragm according to the present invention employs a honeycomb core structure which is provided, adherently on at least one side thereof, with a skin member comprised of aromatic polyamide material, for example a woven fabric prepared by the use of aromatic polyamide fibers and by further reinforcing them with a thermo-setting resin, having a high tensile strengly $\sigma$, a high Young's modulus E and a high Young's modulus-to-weight ratio $E/\rho$. Therefore, the resulting diaphragm of the present invention has as a whole a high overall Young's modulus E, and thus it has a good sound reproduction efficiency. Besides, this diaphragm as a whole has a high overall Young's modulus-to-weight ratio $E/\rho$, so that there can be obtained an excellent sound reproduction characteristic as represented by wide range vibration, by reduced distortion through wide range of frequency and by a good transition characteristic. Especially, this diaphragm provides an improved penetrating sound in the high frequency range. Furthermore, the diaphragm can have an internal loss $\eta$ (dissipation factor $\tan \delta$) of a value close to that of a paper diaphragm inherently having a relatively large value of internal loss, by increasing the internal loss of the thermo-setting resin per se with which the fibers are impregnated. Thus, the diaphragm is able to suppress the development of resonance in the high frequency range. That is, even when partial vibration takes place, this vibration can be reduced to a negligibly small level and the quality factor Q of the partial vibration resonance can be made small enough, whereby a flat frequency characteristic of the reproduced sound can be obtained. Furthermore, the overall mechanical strength of the diaphragm is large, which, in turn, eliminates the fear for deformation of the diaphragm, and the diaphragm exhibits a high resistance to large surge input. Besides, the skin member is prepared simply by the use of a prefabricated woven fabric of aromatic polyamide fibers, and impregnating it with a thermo-setting resin and thereafter setting them. Thus, its manufacture (molding) is easy and such a skin member as disclosed by the present invention is desirable from the viewpoint of mass production. Accordingly, the cost of manufacture of the diaphragm as a whole becomes relatively low. Also, because of the low density $\rho$ of this skin member, being less than one half of that of the aluminum foil, there can be obtained a large thickness which is about twice that of aluminum foil. Thus, the development of dimples, i.e. depressions in the skin member due to the hollow cell portions of the honeycomb core, can be suppressed.

What is claimed is:

1. An electro-acoustic transducer diaphragm comprising:
   a cellular core member formed of a metal foil and having a honeycomb structure;
   a skin member disposed on and bonded to each side of said cellular core member, said skin member being composed of aromatic polyamide fibers impregnated with a set thermo-setting resin; and
   a bonding agent for bonding said skin member to said cellular core member.

2. An electro-acoustic transducer diaphragm comprising:
   a cellular core member formed of a metal foil and having a honeycomb structure;
   a skin member disposed on and bonded to each side of said core member, said skin member being an aromatic polyamide film; and
   a bonding agent for bonding said skin member to said cellular core member.

3. An electro-acoustic transducer diaphragm comprising:
   a cellular core member formed of a film of a high molecular weight material and having a honeycomb structure;
   a skin member disposed on and bonded to each side of said core member, said skin member composed of aromatic polyamide fibers impregnated with a set thermo-setting resin; and
   a bonding agent for bonding said skin member to said cellular core member.

4. An electro-acoustic transducer diaphragm comprising:
   a cellular core member formed of a film of a high molecular weight material and having a honeycomb structure;
   a skin member disposed on and bonded to each side of said core member, said skin member being an aromatic polyamide film; and
   a bonding agent for bonding said skin member to said cellular core member.

5. A diaphragm according to claim 1, 2, 3 or 4 wherein said aromatic polyamide material is selected from poly-p-benzamide and polyparaphenylene-terephthalamide.

6. A diaphragm according to claim 1 or 2 wherein said metal is selected from aluminum and an aluminum alloy.

7. A diaphragm according to claim 3 or 4 wherein said high molecular weight material is a phenol resin impregnated polyamide material.

8. A diaphragm according to claim 1 or 3 wherein said skin member is one prepared by impregnating a thermosetting resin impregnated woven aromatic polyamide fabric.

9. A diaphragm according to claim 1 or 3 wherein said skin member is a thermo-setting resin impregnated non-woven material of aromatic polyamide fibers.

10. A diaphragm according to claim 9 wherein said thermo-setting resin is selected from epoxy resin, unsaturated polyester resin, and phenol resin.

11. A diaphragm according to claim 8 wherein said thermo-setting resin is selected from epoxy resin, unsaturated polyester resin, and phenol resin.

* * * * *